United States Patent [19]

Flothmann et al.

[11] 4,269,473
[45] May 26, 1981

[54] IDENTIFICATION CARD WITH A HOLOGRAM AND A PROCESS FOR THE PRODUCTION THEREOF

[75] Inventors: Detlev Flothmann, Munich; Hartwig Ruell, Fuerstenfeldbruck; Angelika Staimer, Munich, all of Fed. Rep. of Germany

[73] Assignee: Siemens Aktiengesellschaft, Berlin & Munich, Fed. Rep. of Germany

[21] Appl. No.: 17,238

[22] Filed: Mar. 5, 1979

[30] Foreign Application Priority Data

Mar. 23, 1978 [DE] Fed. Rep. of Germany ....... 2812841

[51] Int. Cl.³ .......................... G03H 1/02; G03H 1/04
[52] U.S. Cl. ........................ 350/3.61; 40/2.2; 283/9 R; 350/3.69; 350/3.83
[58] Field of Search ......................... 350/3.6-3.86; 283/6, 7, 9 R; 40/2.2; 235/457

[56] References Cited

U.S. PATENT DOCUMENTS

| | | | |
|---|---|---|---|
| 3,620,590 | 11/1971 | Barker | 40/2.2 X |
| 3,643,216 | 2/1972 | Greenaway et al. | 235/457 X |
| 3,668,795 | 6/1972 | Barker | 283/7 X |
| 3,894,756 | 7/1975 | Ward | 40/2.2 X |
| 4,014,602 | 3/1977 | Ruell | 40/2.2 X |
| 4,126,373 | 11/1978 | Moraw | 40/2.2 X |
| 4,131,337 | 12/1978 | Moraw et al. | 350/3.86 |
| 4,140,373 | 2/1979 | Rüll | 40/2.2 X |
| 4,171,766 | 10/1979 | Ruell | 40/2.2 X |
| 4,171,864 | 10/1979 | Jung et al. | 40/2.2 X |

FOREIGN PATENT DOCUMENTS 2558056 12/1975 Fed. Rep. of Germany .

*Primary Examiner*—John K. Corbin
*Assistant Examiner*—Bruce Y. Arnold
*Attorney, Agent, or Firm*—Hill, Van Santen, Steadman et al.

[57] ABSTRACT

An identification card, which has an increased safeguard against counterfeiting, comprises both a hologram containing information and information which is visible recorded in a single layer of recording material disposed on a substrate. The card is produced by first recording the visible information on a layer and then recording a hologram in a portion of the layer. Since the hologram may include both the visible information of the card and information which is coded to be read only by a machine, the process for evaluating the hologram converts the reconstructed hologram into electrical signals by means of a vidicon. Then the signals, which correspond to the machine-readable coded information, are separated from the other signals and processed separately. A practical apparatus for recording the hologram on the card includes imaging optics for forming a demagnified real image of the overall view of the identification card and mirrors for reflecting the imaging beam path onto the portion of the card as an object wave for recording the hologram.

29 Claims, 7 Drawing Figures

IDENTIFICATION CARD WITH A HOLOGRAM AND A PROCESS FOR THE PRODUCTION THEREOF

BACKGROUND OF THE INVENTION

1. Field of the Invention

The present invention is directed to an identification card, which has a safeguard against counterfeiting and includes a layer consisting of a recording material in which a hologram has been recorded.

2. Prior Art

Identification cards, which are provided with means to safeguard against counterfeiting or falsifying, which means includes a hologram containing selected information, are known and an example is disclosed in German Offenlegungsschrift No. 25 58 056. This type of identification card is produced by means of recording a hologram of an object carrying information on a light sensitive recording material with the help of an object beam and a reference beam. Before the holographic exposure of the recording material with the object beam containing the information which is to be recorded in the hologram, the light sensitive recording material was secured and permanently connected to the information card. During the recording of the hologram, the object wave, which is reflected from the object, is directed onto the recording material and interferes with the reference beam to form the hologram of the information to be recorded.

SUMMARY OF THE INVENTION

The present invention is directed to providing an identification card containing a hologram which card has an increased security from counterfeiting.

To accomplish this task, the identification card which is provided with means for safeguarding against counterfeiting, includes a substrate having a single layer uniformly provided thereon, visible information recorded on said single layer and a hologram recorded in a portion of the single layer, said hologram including information forming the means for safeguarding.

By this type of structure, both the information contained in the hologram and the non-holographic identification information, which is visible, are inseparably connected with one another in a single layer which is on a one-piece carrier or substrate. Preferably, the recording field of the single layer for receiving both the visible identification information and the hologram extends over substantially the entire surface area of the card with the information that is to be visibly read out being recorded as a clear image on the layer of recording material. The hologram may include a hologram of either the entire information contained in the identification card, or a portion thereof, and, in addition, the hologram may include information which is in a machine-readable code. The information which is recorded in the hologram may be a plurality of different types of information with each type being recorded with at least one of the angles for the reference beam and the wavelength being different so that a selected type of information can be retrieved by addressing the hologram with a retrieval beam of a selected wavelength and a selected angle.

The hologram, which may be a volume phase hologram, may be either a transilluminated hologram or a white light hologram. The substrate may be a transparent layer composed of a carrier layer of material selected from a group consisting of triacetates and polyesters. The single layer of recording material is preferably a photographic material, which is selected from a group consisting of silver halide emulsions, photo polymers and dichromate gelatin. The single layer may be surface bonded with an opaque layer, such as paper, which opaque layer has recorded boundary layers or division fields for the different types of visible information of the card. In addition to the opaque paper layer, a covering layer may be applied so that the card has essentially three layers bonded or laminated together which layers are the substrate, opaque paper layer and covering layer.

When evaluating information contained in a hologram of the identification card, particularly a hologram which includes both the visible information of the card plus machine-readable coded information, the process includes applying a retrieval beam to reconstruct an image of the hologram and projecting the reconstructed image of the hologram on a vidicon. The vidicon converts the reconstructed hologram into electrical signals. The electrical signals corresponding to the visible information are applied to a monitor for display and the electrical signals corresponding to the machine-readable code information are delivered to a device which includes means for evaluating information contained in the machine-readable code.

To produce the identification card, the process preferably includes the step of first recording the visible information on a layer of recording material and then subsequently recording the hologram on the same single layer. Preferably, the step of first recording the visible information includes exposing the layer with the visible information that is to be recorded, subsequently developing the layer, and then sensitizing a portion of the layer of the recording material to enable recording the hologram thereon. The step of recording the hologram comprises exposing the sensitized portion of the layer with an object wave and a reference wave and subsequently developing the exposed portion. If the recording medium is a dichromate gelatin, the step of sensitizing the portion of the recording medium prior to forming the hologram comprises covering the portion of the dichromate gelatin layer with a dichromate liquid. Preferably, the step of exposing the sensitized portion of the layer with an object wave and reference wave to form a hologram includes masking the sensitized portion with a mask or cover. In one embodiment, a mask is used on each side thereof with one of the two masks having an aperture. The method includes projecting light through the recorded information of the recording material to obtain an object wave and projecting the object wave and reference wave through said aperture to holographically expose the sensitized portion of the recording material.

An apparatus for recording the hologram can preferably include imaging objects for producing a demagnified real image of the visible information recorded on the card, means for directing the imaging beams of the real image to form an object wave directed at a portion of the recording medium with the real demagnified image being located at a distance from the photo layer, said means including a mirror and means for generating a reference wave directed at the recording medium for recording the hologram. The device can include a slit diaphragm disposed between the layer of recording material and imaging optics. If the reference beam is diverging, the point source is disposed at the same distance from the hologram as the real image, and preferably, with an angle between the object and reference beams being greater than 30°.

The apparatus preferably includes a light source for generating a coherent light, which source is disposed on one side of the identification card opposite to the optics, a diffuser being disposed between the light source and the photographic layer of the card and a mask being arranged between the diffuser and the recording field for the sensitized material so that light from the source does not expose the sensitized portion. While the mask may include an aperture for projecting an object and/or a reference wave therethrough, the mask may also be an impermeable mirror having a mirror surface facing the photographic layer and the mirror is arranged at an angle to the photographic layer so that a reference beam may be projected onto the sensitized layer from the side of the mask.

DESCRIPTION OF THE PREFERRED EMBODIMENTS

Figure 1:
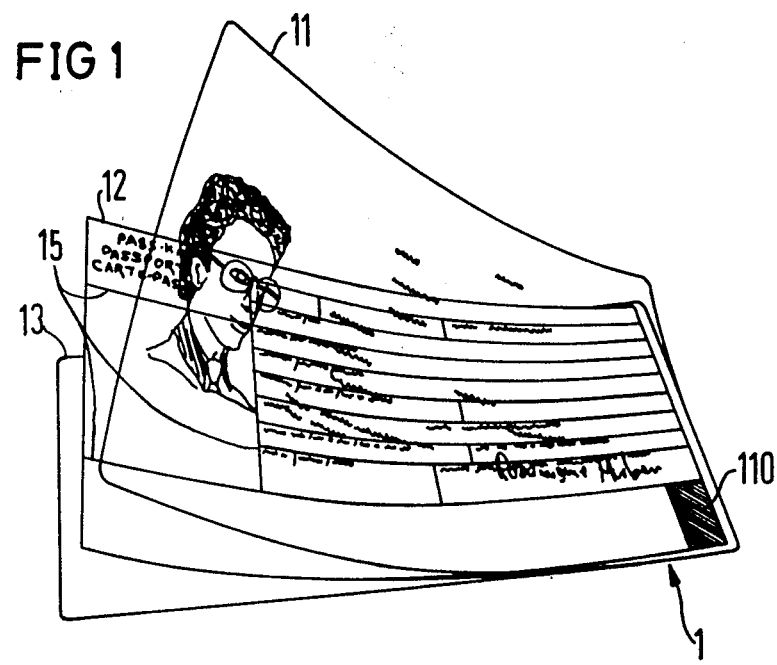
FIG. 1 is a view of an identification card in accordance with the present invention with a portion of the three layers being partially spread apart for purposes of illustration.

The principles of the present invention are particularly useful when incorporated in an identification card generally indicated at 1 in FIG. 1. As illustrated in FIG. 1, the identification card 1 consists of three layers 11, 12 and 13. The layer 11 is a developed photographic film on which the hologram and non-holographic identification information are recorded. The film may be a standard photographic film material, for example, a photographic film of the following designation Agfa RO 81p, Kodak SO 299 or Kodak SO 235 and the film 11 consists of a transparent carrier layer or substrate on which the photosensitive layer is applied. This photosensitive layer forms the layer consisting of the recording material. The hologram and the non-holographic identification material such as alpha-numerical data and the pure image information, such as, for example a passport photo, are recorded on the photosensitive layer at the same time. It is essential that the photographic layer, which serves for the recording of information, is a single layer uniformly formed with a base material, for example gelatin, so that the holographic and non-holographic information are thereby truely inseparably connected with one another without media boundaries.

In FIG. 1, a hologram 110 is located at the right hand lower corner of layer 11 and the non-holographic information, which is visible to the viewer and is referred to as visible information, is distributed over the entire surface area of the identification card. The visible information can include both pictorial representation, script such as signatures and alpha-numerical characters. Because of the truely inseparable connection between the hologram and the visible information on the photosensitive layer, the hologram 110 cannot be removed, for example punched out, and replaced with a different hologram without the tampering being detectable.

The photographic layer is located on the side of the layer or substrate 11 which faces the layer 12. Thus, the photosensitive layer is sandwiched between the layer 12 and the layer 11. The layer 12 consists of an opaque material such as paper and can contain a framework or boundary lines 15 to separate the alpha-numerical data of the identification card. These framework and boundary lines 15 form boxes with legends for the different types of information such as name, signature, address and birth date and can be preprinted in a traditional manner with traditional safety marks such as water marks or tokens on the paper forming the middle layer 12. The layer 13 serves exclusively as a covering layer and is preferably fabricated of transparent material, for example transparent plastic. Thus, the layer 12 and the photosensitive layer on the layer 11 are sandwiched between two outermost layers 11 and 13.

Diverse light sensitive materials can be used as the single layer of recording material, which is to be selected above all from the standpoint of recording the hologram. For purposes of protecting the identification card, the layer of photosensitive material may be selected from a group consisting of high resolution silver halide emusions, photo polymers and dichromate gelatins. The layer of photosensitive or recording material is preferably only a few thousands of a millimeter thick and is particularly applied to a carrier film forming the layer 11, which is selected from a group consisting of triacetate and polyester.

The hologram 110 which is used for the protection of the identification card can contain any kind of information. For example, the hologram 110 can include pictorial information including pictures, portraits and signatures, and the hologram can include written information such as alpha-numerical characters or can contain digital information such as code characters that are machine-readable. The hologram can contain an overall view of the identification card, an overall view and strip of code characters or a partial section of the identification card, for example only the picture and signature. Thus, the hologram such as 110 may have various combinations of the above mentioned information to provide protection of the card against falsification or counterfeiting.

Figure 2:
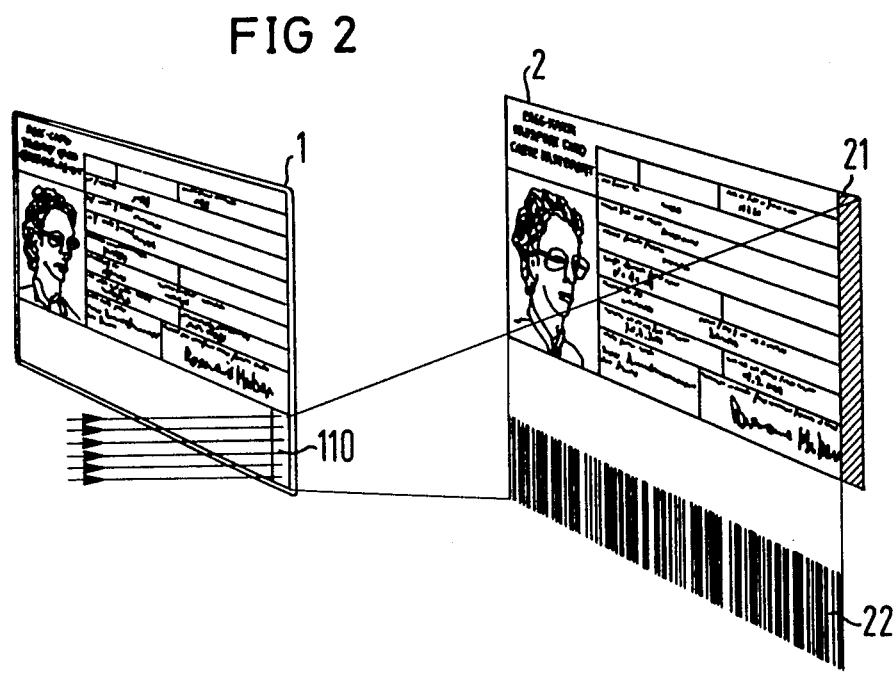
FIG. 2 is a perspective view showing the identification card of the present invention and the reconstructed image of the hologram contained therein.

As illustrated in FIG. 2, the identification card 1 with the hologram 110 has the image of the hologram 110 being retrieved to produce a reconstructed hologram image 2. As illustrated, the image 2 includes all of the visible information of the identification card 1 with a dark strip 21 along the right side thereof and additional information 22 which is digital information of coded characters which can be read by a machine. The hologram content or image 2 is only an example of the possibilities of the information which can be recorded in the hologram. However, it should be noted that this particular combination of information is very advantageous for the purpose of protecting the integrity of the identification card.

Two types of holograms can be considered for the protection of the identification card. These types are transillumination holograms and white light holograms. The transillumination hologram is recorded and reproduced with coherent monochromatic light. It has a high degree of redundancy and a large resolution. The white light hologram is recorded with coherent light and can be evaluated with both laser light as well as with white light, for example an automobile spot light, sun light or a flashlight. Thus, in the example of the hologram image 2, the analog part can be read out with white light and the machine-readable part can be read out with the laser light.

An amplitude or phase hologram can be used for the hologram. The non-holographic information, for example divisional information, which can be directly read off of the layer, can be applied to the layer of a recording medium in a multitude of methods. For example, it can be applied by means of photographic exposure, it can be printed or it can be written on the layer.

Figure 3:
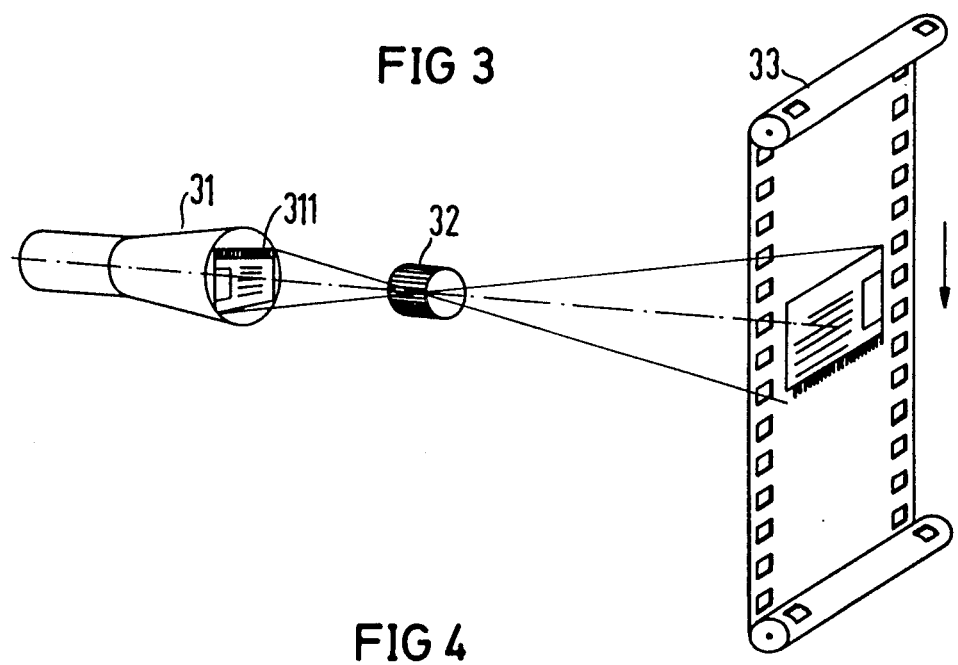
FIG. 3 is a perspective view to schematically illustrate the recording of a non-holographic information on a portion of the card.

An installation for the production of the non-holographic or visible information is schematically illustrated in FIG. 3. In this installation, the visible information is photographically recorded on a film 33. The information is generated in an electron beam tube 31, whose image 311 of the information to be placed on the identification card, is imaged on the photographic film 33 by an imaging optic 32 to thus expose the film. As illustrated, the image projected on the film 33 has a width of approximately 150 mm. The identification picture contains all of the data including the passport picture and signature. In addition, personal and other data can be applied to the film in a digital code, which is in machine-readable form (see the digital information 22 in FIG. 2). This machine-readable code strip lies outside of the actual identification field for the card and is not a component part of the identification card but will be a part of the hologram contents as shown by the reconstructed image 2.

Figure 4:
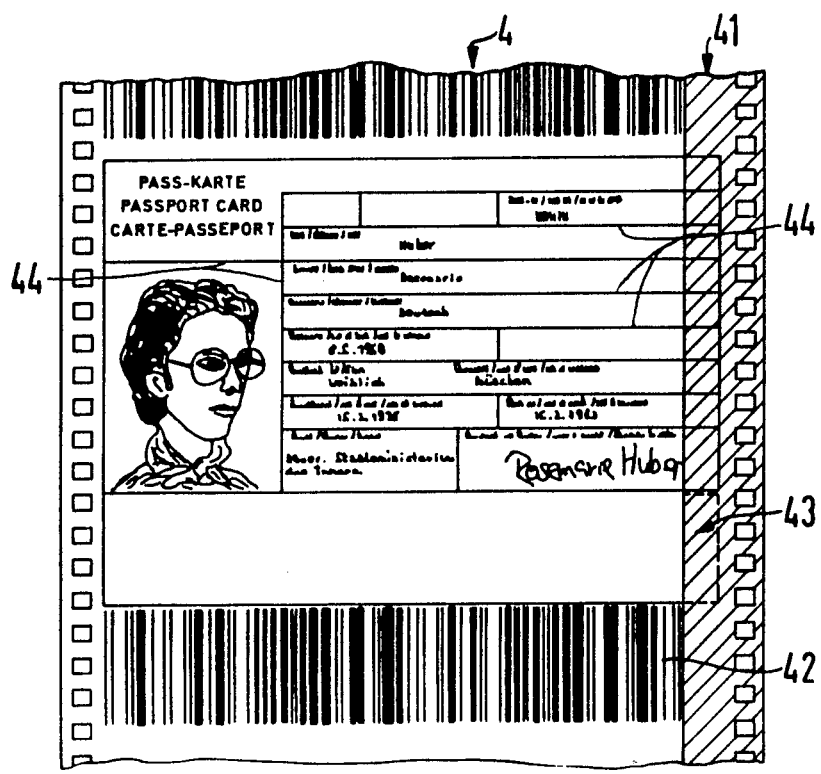
FIG. 4 shows a portion of the card prior to recording the hologram but with the visible information recorded thereon.

After the exposure, as illustrated in FIG. 3, the film is developed and a developed picture can be further processed into the identification card. The developed film must again be sensitized for the recording of the hologram. In the present case, this occurs by means of dichromization. To that end, the gelatin of the film is subjected to a dichromate liquid. However, this need only occur just prior to the time when the hologram is actually to be recorded. Expediently, only a strip along the edge of the film is dichromized. As illustrated in FIG. 4, a section 41 of the completely developed film 4 is resensitized by means of dichromization for the hologram exposure. In addition to the information in the clear image which includes a photo, a signature and other information in appropriate boxes formed by the boundary lines 44, the film also contains information, which is in a machine-readable code which is presented by means of the strip 42 of digital information. The film is dichromized in the shaded area 41 at the right edge and thus, sensitized for exposure of a hologram which will be recorded in the area 43 which is framed in broken lines. After sensitizing the strip 41, the hologram is recorded in the area 43 to complete the recording of the information on the single layer of recording material.

Figure 5:
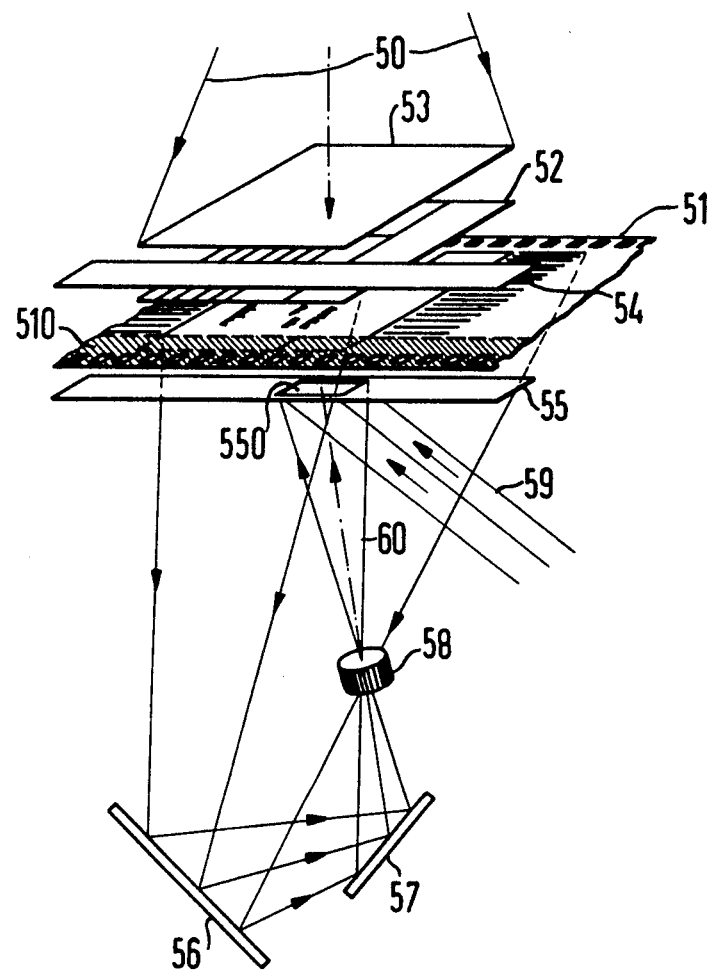
FIG. 5 is a perspective view schematically illustrating the arrangement used for recording a hologram on the card.

An arrangement for recording a hologram on the identification card is illustrated in FIG. 5. A film 51, which contains a strip of the machine-readable code and the visible information for the identification card is positioned in relation with a transparent plate 52, which is provided with the outline of the various boxes for the information that is to be contained in the card. It should be noted that unlike film 4, film 51 does not contain the boundary or outline that form the boxes. A diffuser plate 53 is provided above the plate 52. The film 51 has been provided with a sensitized strip 510 similar to the strip 41 in FIG. 4. To prevent undesirable exposure of the sensitized strip portion 510, a covering diaphragm or mask 54 is disposed on top of the strip and a second mask or cover strip 55, which has an aperture 550, is arranged on the underside of the strip 510 of the film 51. The strip 55 is positioned so that the aperture 550 is located in the desired portion on the strip 510 for the hologram which would be the area such as 43 of FIG. 4.

The diffuser 53 is illuminated from above with the laser light 50 so that the visible information that has been recorded on the film 51 together with the background information which are the various printed boxes on the plate 52 are formed below the film 51 as a clear picture. The picture which is visible on the underside of the film is reflected by mirrors 56 and 57 through imaging optics 58 so that a demagnified purely real picture is used as the object wave for the hologram exposure. The object wave 60 and a reference wave 59 are projected through the aperture 550 to form a hologram recording in a portion of the sensitized strip 510. After exposing the film in this manner with the information to record the hologram therein, the film 51 is again developed and after drying, individual identification cards can be cut from the film and are composed of the visible information of the card which is within the field of the plate 52 and the hologram. It should be noted that the strip of machine-coded information is not included as part of the visible information of the card and is only included in the hologram. It also should be noted that both the hologram and the visible information are recorded in the same single layer of recording material and the identification card utilizing the information can be neither forged nor altered.

Since layer 11 of FIG. 1 is pellucidly transparent except for the alpha-numerical characters and portrait, and is used as the object wave for the holographic exposure 110, a very good image quality is obtained from the reproduction 2 (FIG. 2) of the hologram 110. The hologram information is preferably stored in the depth of the layer as a volume phase hologram.

Figure 6:
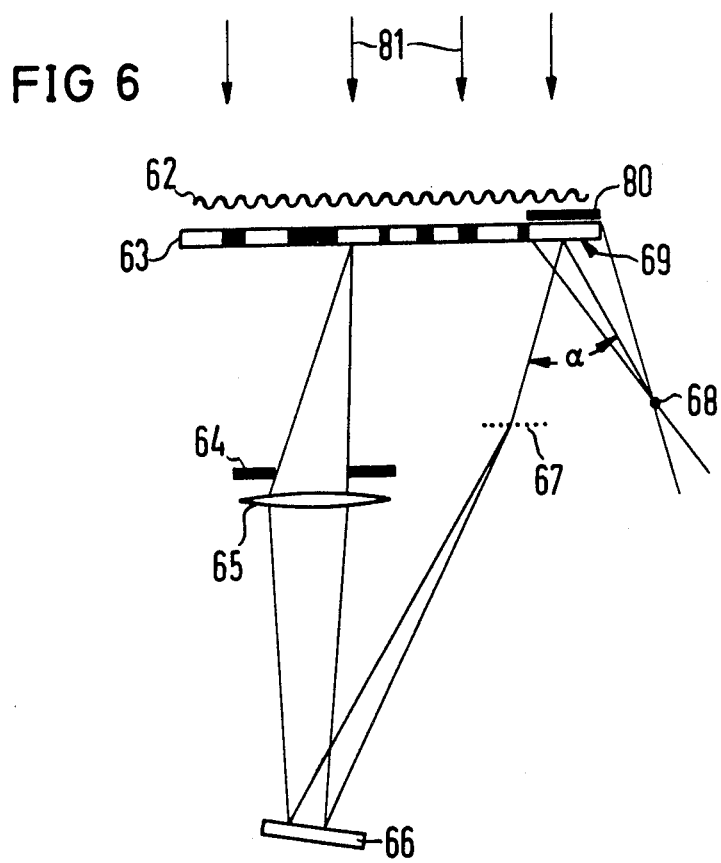
FIG. 6 is a schematic illustration of a different arrangement for recording a hologram on an identification card.

FIG. 6 schematically illustrates an embodiment of the installation illustrated in FIG. 5. In this arrangement, the imaging optics, which consist of a lens 65 and a mirror 66, are arranged differently than in the arrangement of FIG. 5 which, however, is not significant since in this arrangement as in the arrangement of FIG. 5, a demagnified real image such as 67 of the visible information of the identification card is generated in front of the film and is utilized as an object for the holographic exposure. In the arrangement of FIG. 6, a diffuser 62 is positioned above the photographic film 63 and an upper covering diaphragm or mask 80 overlies the sensitized portion of the film 63. As in the previous embodiment, light 81 from a source above the diffuser 62 passes through the diffuser 62.

In the arrangement illustrated in FIG. 6, the hologram, which is recorded, can be read out with transmitted light which optionally may be either laser light or also with white light such as from a flashlight or the sun.

To that end, the following boundary conditions are maintained. The scattering medium or diffusing plate 62 is a pure phase object with a structure just resolved by the lens 65, which has a split diaphragm 64 arranged in front of it. Thereby, a nearly granulation-free picture is obtained upon reproduction. The source 68 of the reference wave and the real image 67 lie on a circular arc whose radius has a center at the hologram center on the sensitized hologram field 69 of the film 63. The identification card need not be exactly adjusted laterally or in the direction of its height for reading out the hologram. The angle between the axis of the reference wave extending from the source 68 to the center of the hologram 69 and from the center to the center of the real image 67 should be made as large as possible and thereby a clear color separation is achieved upon retrieving the information recorded in the hologram.

During the exposure, the object and reference waves can also be convergent instead of divergent as illustrated. The slit diaphragm 64 is particularly important to enable retrieving the hologram information during a read out with white light. Upon reading out with white light, one proceeds in such a manner that the hologram is transilluminated with white light from the backside. Thereby, the demagnified real image of the identification card is reconstructed in space but, at the same time, also a real image of the slit diaphragm 64 is produced. For various colors, the real image appears with various angles to the plane of the hologram. When one applies one's eye to a real slit image, then one can observe the real demagnified image of the identification card in a specific color.

One can proceed in two ways when reading out with the laser light. The reconstruction wave is selected so that it is identical to the reference wave used during recording of the hologram. A lens is arranged on the side of the hologram facing away from the light source of the retrieval wave in such a manner that it is located in the beam path of the object wave projected in continuation beyond the hologram. Upon retrieval, a real image of the identification card is then generated behind this lens. With the other alternative, the reproduction wave or retrieval wave is propagated in the opposite direction to the reference wave but is otherwise identical with it. The real image is reconstructed at the original location presuming that the wavelength of the retrieval wave is equal to the wavelength of the reference wave during recording.

Lippmann-Bragg holograms can also be utilized with the arrangement according to FIGS. 5 and 6. When recording such a hologram, the object and reference light sources are not located on the same side of the hologram. Thus, light must also be able to enter the hologram from the other side. Since, in the apparatus or arrangement described up to now, one side of the sensitized strip of the film is completely covered by means of a covering mask or diaphragms 54 (FIG. 5) and 80 (FIG. 6), a light access must be created. This advantageously occurs in such a manner that the covering layer or diaphragm 54 and 80, respectively, are replaced by a correspondingly shaped mirror which is arranged inclined to the plane of the film. This mirror must be light impermeable. With such a mirror, it can be achieved that the sensitized strip now, as before, is protected from destructive light 50 and 81 which occurs above the strip but, however, the strip can nonetheless, be exposed from both sides. In the arrangement according to FIGS. 5 and 6, for example, the reference light source is projected on this mirror which guides the light in the direction of the area where the hologram is to be recorded.

Figure 7:
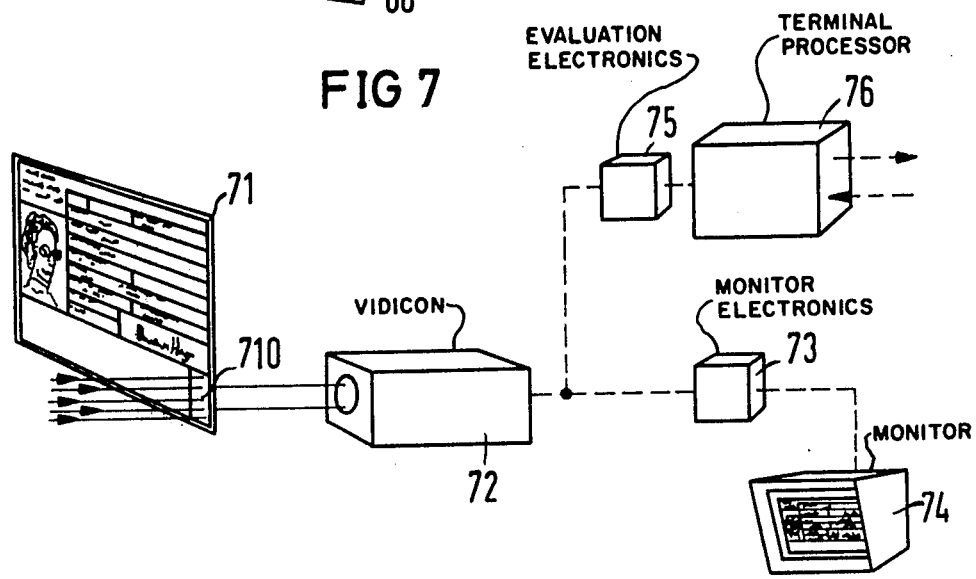
FIG. 7 is a schematic illustration of a device for evaluating the information contained in the hologram.

In order to utilize the information contained in the hologram, such as the hologram 710 of the identification card 71 illustrated in FIG. 7, an evaluation installation is utilized and is schematically illustrated in FIG. 7. If the hologram 710 contains the same information as the hologram 110 of FIG. 2, then the hologram contains the entire visible information of the card 71 plus the strip of digital or machine-coded information similar to the strip 22 of FIG. 2. In the apparatus of FIG. 7, the hologram 710 of the identification card 71 is reconstructed by means of a laser light. The object wave is received by a vidicon 72, which converts the reconstructed image into electrical signals. The electrical signals delivered from the vidicon are now divided with the signals which correspond to the visible information of the identification card being supplied to a monitor electronics 73 and then to a monitor 74. The signals, which correspond to the machine-readable coded information, are delivered to a terminal processor 76 for further processing via the adaptation of evaluation electronics 75. Thus, the visible information of the card 71 can be monitored and viewed on the monitor 74 and the machine-readable information is processed by a reading device such as a computer which can determine the information coded into the strip of information.

Although various minor modifications may be suggested by those versed in the art, it should be understood that we wish to employ within the scope of the patent granted hereon, all such modifications as reasonably and properly come within the scope of our contribution to the art.

We claim:

1. An identification card provided with means for safeguarding against counterfeiting, said identification card including a substrate having a single layer of recording material uniformly provided thereon, visible information recorded on said single layer and a hologram recorded in a portion of the single layer, said hologram including information forming the means for safeguarding.

2. An identification card according to claim 1, wherein the recording field of the single layer for receiving the visible identification information and the hologram extends over substantially the entire surface area of the card.

3. An identification card according to claim 2, wherein the information that can be visibly read out is recorded as a clear image on the single layer of recording material.

4. An identification card according to claim 1, wherein the hologram includes a hologram of the entire information contained on the identification card.

5. An identification card according to claim 1, wherein the hologram includes machine-readable coded information.

6. An identification card according to claim 1, wherein a plurality of different types of information are recorded in said hologram with each type being recorded with at least one of the angles for the reference beam and the wavelength being different so that a selected one of the types can be retrieved by addressing the hologram with a retrieval beam of a selected wavelength and at a selected angle.

7. An identification card according to claim 1, wherein the hologram is a transilluminated hologram.

8. An identification card according to claim 1, wherein the hologram is a white light hologram.

9. An identification card according to claim 1, wherein the substrate is a transparent layer.

10. An identification card according to claim 9, wherein the substrate is of a material selected from a group consisting of triacetates and polyesters.

11. An identification card according to claim 1, wherein the layer of recording material is a photographic material.

12. An identification card according to claim 11, wherein the photographic material is surface bonded with an opaque layer.

13. An identification card according to claim 12, wherein the opaque layer includes recorded boundary layer and field divisions for the visible information of the card.

14. An identification card according to claim 12, wherein the opaque layer consists of paper.

15. An identification card according to claim 14, wherein the opaque paper layer is additionally surface bonded with a covering layer.

16. An identification card according to claim 11, wherein the recorded hologram is a volume phase hologram.

17. An identification card according to claim 11, wherein the photographic material is selected from a group consisting of silver halide emulsions, a photopolymer and dichromate gelatin.

18. An identification card according to claim 1, wherein the hologram includes machine-readable coded information and at least a portion of the visible information of the card.

19. A process for the production of an identification card having both a hologram and visible information recorded in a single continuous layer of recording material on a substrate, said process including the steps of first recording the visible information on the single layer of recording material and then subsequently recording the hologram on said single layer.

20. A process according to claim 19, wherein the step of first recording the visible information on the single layer includes exposing the single layer with the visible information that is to be recorded, subsequently developing the single layer, and then sensitizing a portion of the single layer of recording material to enable recording the hologram thereon, and wherein said step of recording the hologram comprises exposing the sensitized portion of the single layer with an object wave and a reference wave and subsequently developing said exposed portion to form the hologram.

21. A process according to claim 20, wherein the recording medium is a layer of dichromate gelatin and the step of sensitizing a portion of the recording medium prior to forming the hologram comprises covering the portion of the dichromate gelatin layer with a dichromate liquid.

22. A process according to claim 20, wherein the step of exposing the sensitized portion of the layer with an object wave and reference wave includes masking the sensitized portion with a mask on each side thereof with one of the two masks having an aperture, projecting light on the recorded information of the recording material to obtain an object wave, and projecting the object wave and reference wave through said aperture to holographically expose the sensitized portion of the recording material.

23. A process for evaluating information contained in a hologram of an identification card which has a single layer on a substrate with both visible information recorded and a hologram recorded therein, said hologram including at least a portion of the visible information and machine-readable coded information, said process comprising applying a retrieval beam to reconstruct an image of the hologram, projecting the reconstructed image of the hologram on a vidicon, said vidicon converting the reconstructed hologram into electrical signals, applying the electrical signals corresponding to the visible information to a monitor for display, and delivering the electrical signals corresponding to the machine-readable coded information to a device having means for further evaluating said machine-readable information.

24. An apparatus for recording a hologram on a single layer of recording material on a substrate of an identification card having visual information recorded in said layer, said apparatus including: imaging optics for producing a demagnified, real image of the visible information recorded on the card; means for directing the imaging beam of the real image to form an object beam directed at a portion of the recording medium with the real, demagnified image being located at a distance from the single layer, said means including mirrors; and means for generating a reference wave directed at the recording medium to interfere with the object beam to record the hologram.

25. An apparatus according to claim 24, including a slit diaphragm disposed between the single layer of recording material and the imaging optics.

26. An apparatus according to claim 24, wherein the means for forming the reference wave and the demagnified real image are disposed at the same distance from the hologram.

27. An apparatus according to claim 24, wherein the angle between the object beam and the reference beam is greater than 30°.

28. An apparatus according to claim 24, which includes a light source for generating the coherent light disposed on a side of the identification card opposite the position of the optics, a diffuser disposed between the light source and the single layer, and a mask arranged between the diffuser and the recording field for masking the sensitized material so that light from the source does not expose the sensitized portion.

29. An apparatus according to claim 28, wherein the mask layer comprises an impermeable mirror having a mirror surface facing the single layer, said mirror being arranged at an angle to the plane of the single layer.

* * * * *